(12) United States Patent
Rayes et al.

(10) Patent No.: US 7,237,267 B2
(45) Date of Patent: Jun. 26, 2007

(54) POLICY-BASED NETWORK SECURITY MANAGEMENT

(75) Inventors: Ammar Rayes, San Ramon, CA (US); Michael Cheung, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 327 days.

(21) Appl. No.: 10/688,051

(22) Filed: Oct. 16, 2003

(65) Prior Publication Data

US 2005/0086502 A1    Apr. 21, 2005

(51) Int. Cl.
*G06F 11/00* (2006.01)

(52) U.S. Cl. .............................. 726/25; 726/1; 726/11; 726/13; 726/23; 726/24; 713/165; 713/166; 713/167

(58) Field of Classification Search ........ 713/165–167; 726/1, 11, 13, 23–25
See application file for complete search history.

(56) References Cited

U.S. PATENT DOCUMENTS

| | | | |
|---|---|---|---|
| 5,787,161 | A | 7/1998 | Rayes et al. |
| 5,933,645 | A | 8/1999 | Wallack |
| 6,038,322 | A | 3/2000 | Harkins |
| 6,049,834 | A | 4/2000 | Khabardar et al. |
| 6,119,231 | A | 9/2000 | Foss et al. |
| 6,131,163 | A | 10/2000 | Wiegel |
| 6,134,559 | A | 10/2000 | Brumme et al. |
| 6,215,878 | B1 | 4/2001 | Harkins |
| 6,282,546 | B1 | 8/2001 | Gleichauf et al. |
| 6,298,383 | B1 | 10/2001 | Gutman et al. |
| 6,298,444 | B1 | 10/2001 | Foss et al. |
| 6,301,613 | B1 | 10/2001 | Ahlstrom et al. |
| 6,301,668 | B1 | 10/2001 | Gleichauf et al. |
| 6,324,656 | B1 | 11/2001 | Gleichauf et al. |
| 6,327,618 | B1 | 12/2001 | Ahlstrom et al. |
| 6,347,339 | B1 | 2/2002 | Morris et al. |
| 6,381,646 | B2 | 4/2002 | Zhang et al. |

(Continued)

OTHER PUBLICATIONS

Cisco Systems, Inc., "Release Notes for Cisco Content Routing Software, Release 1.1," 1992-2002, http://www.cisco.com/univercd/cc/td/doc/product/webscale/cr/cr4430/cr_llrn.htm, data retrieved Feb. 11, 2004, pp. 1-19.

(Continued)

*Primary Examiner*—Kambiz Zand
*Assistant Examiner*—Tongoc Tran
(74) *Attorney, Agent, or Firm*—Hickman Palermo Truong & Becker LLP (57) ABSTRACT

A policy-based network security management system is disclosed. In one embodiment, the system comprises a security management controller comprising one or more processors; a computer-readable medium carrying one or more sequences of instructions for policy-based network security management, wherein execution of the one or more sequences of instructions by the one or more processors causes the one or more processors to perform the steps of receiving a set of data regarding a user of a computer network; automatically deciding on a course of action based on the set of data, wherein the course of action may be adverse to the user although the set of data is insufficient to establish whether the user is performing a malicious action; and sending signals to one or more network elements in the computer network to implement the decision.

19 Claims, 3 Drawing Sheets

U.S. PATENT DOCUMENTS

| | | | |
|---|---|---|---|
| 6,396,833 B1 | 5/2002 | Zhang et al. | |
| 6,415,321 B1* | 7/2002 | Gleichauf et al. | 709/224 |
| 6,418,468 B1 | 7/2002 | Ahlstrom et al. | |
| 6,427,174 B1 | 7/2002 | Sitaraman et al. | |
| 6,434,700 B1 | 8/2002 | Alonso et al. | |
| 6,463,061 B1 | 10/2002 | Rekhter et al. | |
| 6,463,474 B1 | 10/2002 | Fuh et al. | |
| 6,466,977 B1 | 10/2002 | Sitaraman et al. | |
| 6,477,651 B1* | 11/2002 | Teal | 726/23 |
| 6,483,921 B1 | 11/2002 | Harkins | |
| 6,484,261 B1* | 11/2002 | Wiegel | 726/11 |
| 6,484,315 B1 | 11/2002 | Ziese | |
| 6,487,666 B1 | 11/2002 | Shanklin et al. | |
| 6,490,289 B1 | 12/2002 | Zhang et al. | |
| 6,490,290 B1 | 12/2002 | Zhang et al. | |
| 6,499,107 B1 | 12/2002 | Gleichauf et al. | |
| 6,530,024 B1* | 3/2003 | Proctor | 726/23 |
| 6,539,431 B1 | 3/2003 | Sitaraman et al. | |
| 6,553,489 B1 | 4/2003 | Osler et al. | |
| 6,560,204 B1 | 5/2003 | Rayes | |
| 6,563,816 B1 | 5/2003 | Nodoushani et al. | |
| 6,567,917 B1 | 5/2003 | Ziese | |
| 6,578,147 B1 | 6/2003 | Shanklin et al. | |
| 6,584,124 B1 | 6/2003 | Blanc et al. | |
| 6,597,957 B1 | 7/2003 | Beakley | |
| 6,609,154 B1 | 8/2003 | Fuh et al. | |
| 6,609,205 B1 | 8/2003 | Bernhard et al. | |
| 6,651,096 B1 | 11/2003 | Gai et al. | |
| 6,658,002 B1 | 12/2003 | Ross et al. | |
| 6,671,811 B1* | 12/2003 | Diep et al. | 726/23 |
| 6,680,998 B1 | 1/2004 | Bell et al. | |
| 6,684,331 B1 | 1/2004 | Srivastava | |
| 6,941,467 B2* | 9/2005 | Judge et al. | 726/22 |
| 6,965,574 B1 | 11/2005 | Cook et al. | |
| 7,124,440 B2 | 10/2006 | Poletto et al. | |
| 2001/0051865 A1 | 12/2001 | Kerr et al. | |
| 2002/0129140 A1* | 9/2002 | Peled et al. | 709/224 |
| 2003/0002436 A1 | 1/2003 | Anderson et al. | |
| 2003/0041153 A1 | 2/2003 | Sharma | |
| 2003/0105866 A1 | 6/2003 | Colrain et al. | |
| 2003/0105867 A1 | 6/2003 | Colrain et al. | |
| 2003/0105993 A1 | 6/2003 | Colrain et al. | |
| 2003/0123421 A1 | 7/2003 | Feige et al. | |
| 2003/0149783 A1 | 8/2003 | McDaniel | |
| 2003/0182433 A1 | 9/2003 | Kulkarni et al. | |
| 2003/0191966 A1 | 10/2003 | Gleichauf et al. | |
| 2003/0217145 A1 | 11/2003 | Leung et al. | |
| 2003/0217180 A1 | 11/2003 | Chandra et al. | |
| 2003/0224788 A1 | 12/2003 | Leung et al. | |
| 2003/0236827 A1 | 12/2003 | Patel et al. | |
| 2004/0008682 A1 | 1/2004 | Miriyala | |
| 2004/0034871 A1 | 2/2004 | Lu et al. | |
| 2004/0073810 A1* | 4/2004 | Dettinger et al. | 713/201 |
| 2004/0088583 A1* | 5/2004 | Yoon et al. | 713/201 |
| 2004/0093513 A1* | 5/2004 | Cantrell et al. | 713/201 |
| 2004/0098623 A1* | 5/2004 | Scheidell | 713/201 |
| 2004/0250133 A1* | 12/2004 | Lim | 713/201 |

OTHER PUBLICATIONS

Cisco Systems, Inc., "IP Source Tracker," 2003, http://www.cisco.com/univercd/cc/td/doc/product/software/ios120/120newft/120limit/120s/120s21/ipst.htm, data retrieved Feb. 11, 2004, pp. 1-15.

Cisco Systems, Inc., "Configuring Denial of Service Protection," 1992-2003, http://www.cisco.com/univercd/cc/td/doc/product/core/cis/7600/software/121e/swcg/dos.htm, data retrieved Feb. 11, 2004, pp. 1-7.

Cisco Systems, Inc., "Cisco IOS Software Release 12.3(4)T: New Security Features and Hardware," 1992-2003, http://www.cisco.com/warp/public/cc/pd/iosw/prodlit/2358_pp.htm, data retrieved Feb. 11, 2004, pp. 1-11.

Cisco Systems, Inc., "Characterizing and Tracing Packet Floods Using Cisco Routers," 1992-2003, http://www.cisco.com/warp/public/707/22.html, data retrieved Feb. 11, 2004, pp. 1-9.

Cisco Systems, Inc., "Release Notes for Cisco Cache Engine 500 Series, Software Version 2.1.0," 1992-2002, http://www.cisco.com/univercd/cc/td/doc/product/webscale/webcache/ce21/rn_ce21.htm, data retrieved Feb. 11, 2004, pp. 1-11.

Cisco Systems, Inc., "SAFE Nimda Attack Mitigation," 1992-2003, http://www.cisco.com/warp/public/cc/so/cuso/epso/sqfr/snam_wp.htm, data retrieved Feb. 11, 2004, pp. 1-6.

Cisco Systems, Inc., "Cisco IOS Software Release 11.3 New Features," 1992-2002, http://www.cisco.com/warp/public/cc/pd/iosw/iore/iore113/prodlit/706_pp.htm, data retrieved Feb. 11, 2004, pp. 1-45.

Cisco Systems, Inc., "Monitoring the System," Chapter 2, Cisco ICS 7750 Administration and Troubleshooting Guide, 1992-2002, http://www.cisco.com/univercd/cc/td/doc/product/voice/ics7750/tblshoot/monitor.htm, data retrieved Feb. 11, 2004, pp. 2-1—2-28.

Cisco Systems, Inc., "Monitoring," Chapter 13, VPN 3002 Hardware Client User Guide, 1989-2000, http://www.cisco.com/univercd/cc/td/doc/product/vpn/vpn3002/3_0/user_gd/monitor.htm, data retrieved Feb. 11, 2004, pp. 13-1—13-47.

Cisco Systems, Inc., "Security Reference Information," 1992-2003, http://www.cisco.com/warp/public/707/ref.html, data retrieved Feb. 11, 2004, pp. 1-3.

Cisco Systems, Inc., "Cisco Security Advisory: TCP Loopback DoS Attack (land.c) and Cisco Devices," 1992-2003, http://www.cisco.com/warp/public/770/land-pub.shtml, data retrieved Feb. 11, 2004, pp. 1-9.

Cisco Systems, Inc., "Network Security Policy: Best Practices White Paper," 1992-2003, http://www.cisco.com/warp/public/126/secpol.html, data retrieved Feb. 11, 2004, pp. 1-7.

Cisco Systems, Inc., "Protecting Your Core: Infrastructure Protection Access Control Lists," 1992-2003, 10 pages.

Cisco Systems, Inc., "Configuring Denial of Service Protection," Chapter 24, Catalyst 6500 Series Switch Cisco IOS Software Configuration Guide—Release 12.1E Guide, pp. 24-1—24-8.

International Searching Authority, "Notification of Transmittal of the International Search Report or the Declaration," PCT/US04/33828, dated Oct. 13, 2004, 13 pages.

Current Claims, PCT/US04/33828, 7 pages.

* cited by examiner

POLICY-BASED NETWORK SECURITY MANAGEMENT

FIELD OF THE INVENTION

The invention generally relates to managing security of a network system. The invention relates more specifically to policy-based network security management.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Service providers are extremely concerned about the stability and security of Internet Protocol (IP) networks. In fact, several wireless network operators have stated that high-volume of malicious user traffic, especially when the network utilization and latency are high, is a source of concern. Such service providers fear that existing network operating systems and procedures are inadequate or traffic analysis is too cumbersome, for the purpose of malicious user detection. As a result, the network may crash before the analysis is completed and the results are understood.

In general, two types of security attacks occur in networks. The first type of attack is performed by an action that is deemed illegal by the network with the intention of contaminating some network information stored in a network element. An example of contaminating network information is contaminating the Address Resolution Protocol (ARP) table of a packet data switch by introducing an erroneous or false Media Access Control/IP (MAC/IP) association. IP address spoofing and MAC address spoofing are launched in this fashion.

The second type of attack is performed by a legal action that is carried out with an exceedingly high intensity, in order to cause a network entity to fail. This is commonly known as a Denial of Service (DoS) attack. A DoS attack is usually done by depleting some network resources. DHCP flooding and ARP table flooding are launched in this fashion. For example, a user may change the network identity (MAC address) and request for an IP address. In DHCP flooding, a malicious user may perform this change exceedingly often over a short period of time and deplete the IP pool so that no one else may obtain an IP address. In ARP table flooding, a malicious user may bombard a network element with bogus MAC and IP address associations. The network element treat each new association as a new device attaching to it and stores it in the ARP table. Eventually, the ARP table will be filled up and the network element will act as a simple bridge and start broadcasting all incoming packets, significantly reducing the performance.

With the advent of programmable networks, a considerable amount of information regarding the condition of network elements is available for making decisions about whether to modify or adjust the network elements to resist an attack. Based on all available information, a network administrator may decide to re-configure one or more network elements, or terminate service completely to individuals or machines that are identified as hackers or malicious users.

However, in prior approaches, information about the state of a network has not been used for making decision of actions against security attacks. In addition, such actions have not been performed with enough granularity, and many harmless users were needlessly affected by actions taken to protect against security threats. Events or actions that utilize the status or states of the network have been termed "adaptive state dependent."

Based on the foregoing, there is a clear need in this field for an improved method for managing network security. It would be particularly desirable to have a method for managing network security that provides adaptive, state dependent, corrective actions having an appropriate amount of granularity in which the state dependency is reflective of the state of the network.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Policy-based network security management is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Structural and Functional Overview
    2.1 Network Operations Center and Its Network
    2.2 Controller
    2.3 Alert
    2.4 User Risk
    2.5 Health
    2.6 Decision
    2.7 Subscriber Management System
  3.0 Operational Examples
    3.1 Method of Policy-Based Network Security Management
    3.2 DHCP Flood Prevention
    3.3 ARP Table Flood Prevention
    3.4 IP Address Spoofing Prevention
    3.5 MAC Address Spoofing Prevention
  4.0 Implementation Mechanisms—Hardware Associated with System
  5.0 Extensions and Alternatives

1.0 General Overview

The needs identified in the foregoing Background, and other needs and objects that will become apparent for the following description, are achieved in the present invention, which comprises, in one aspect, policy-based network security management. A system as described herein may use a policy to identify users that are potentially dangerous to the health of a network and to subsequently decide on a course of action to protect the network. A system as described herein provides several features that can each be used independently of one another or with any combination of the other features. Although many of the features of the present system are motivated by the problems explained above, any individual feature may not address any of the problems discussed above or may only address one of the problems discussed above. Some of the problems discussed above may not be fully addressed by any of the features of the present security system.

In this specification, the words "level" and "state" are used interchangeably. Wherever one is used the other may be substituted. In addition, unless otherwise stated, "user" and "subscriber" are used interchangeably. Furthermore, "alarm" and "security event" need clarification. Security event is any network event that has security implication. It may or may not trigger an alarm to be generated. On the other hand, an alarm can be generated due to any network irregularity. It may or may not be due to a security event. For example, an illegal user action will constitute a security event and will cause an alarm. A high utilization of some network resource will also constitute a security event because it may be caused by some malicious activities. However, no alarm will be generated.

In one embodiment, a policy-based network security management system comprises a security management controller comprising one or more processors; a computer-readable medium carrying one or more sequences of instructions for policy-based network security management, wherein execution of the one or more sequences of instructions by the one or more processors causes the one or more processors to perform the steps of receiving a set of data regarding a user of a computer network; automatically deciding on a course of action based on the set of data, wherein the course of action may be adverse to the user although the set of data is insufficient to establish whether the user is performing a malicious action; and sending signals to one or more network elements in the computer network to implement the decision.

In one embodiment, a controller is included within a Network Operations Center (NOC) to protect a network from user performing acts that degrade the performance of the network. The acts may be legal or illegal and malicious or benign. In an embodiment, a heath parameter is computed based on the health of an entire network and on the health of individual network resources, which is used to take corrective action to ensure the continued operation of a network. In an embodiment a historical parameter (e.g., a user risk level) and parameters related to the current network usage (e.g., health level) and the network alert state (e.g., an alert level) are used in assessing whether to take adverse action against a user. A decision is made based on one or more of the user risk level, alert level, and health level as to whether to take action and what course of action to take against a user whose activity is generating alarms.

In an embodiment, to protect security, a decision is made regarding whether to take action, and if action is to be taken, the type of action to take is based on a combination of historical data gathered over a relatively long time period and instantaneous data gathered over a relatively short period. By keeping track of both long term and short term data an assessment can be made as to the likelihood that an illegal act was intentional, and that a legal act that is potentially injurious to one or more components of a network is likely to escalate or is of a malicious nature.

In an embodiment, an assessment is made regarding the likelihood that a user's current actions will cause damage to the network, and preventive action is taken as possibly a temporary measure until there is time to more thoroughly assess whether the user's actions would result in a degradation of system performance, and/or are likely to have been of a malicious nature.

In an embodiment, to assist in determining a course of action, a health parameter is measured that includes both the health of the network and of various resources within the network critical to the functioning of the network and/or to revenue generation. Thus, for example, when the health of the network is poor, individual users that use a relatively large amount of network resources (for any reason) may be temporarily shutdown to ensure the smooth running of the network for the remaining users.

In an embodiment, the decision may be based on one or more of a user risk assessment, an alert level assessment, and a health assessment relevant to a network. The assessments (or determination) may be referred to as states and may be stored as discrete states and/or may be quantified by choosing one of a discrete set or of a continuum of numerical values. In an embodiment, a variety of different types of events and input are quantified into numerical values to obtain a user risk level, an alert level, and a health level. The numerical values of the levels are then grouped together into states such as low, medium, high, and critical. The user risk state is essentially a long term or historical measurement designed to assess the likelihood or propensity of a user to perform acts that may degrade the performance of the system or illegal acts, and the likelihood that those acts are intentional. The alert level is a measure of the current frequency and/or harmfulness of the illegal acts or acts that negatively affect the health of part or all of the system. The alert level may also include input from an external source related to the likelihood of a malicious or other action that may affect the network. Additionally, the user risk level and/or the health state may have external inputs instead of or in addition to the external input used to determine the alert level (e.g., critical, high, medium, and low).

In this specification, the term network alert level may be a function of illegal requests/alarms at a given point in time. The user risk level may be the historical risk factor that a user posts to the network.

In other aspects, the invention encompasses a computer apparatus and a computer-readable medium configured to carry out the foregoing steps.

Figure 1:
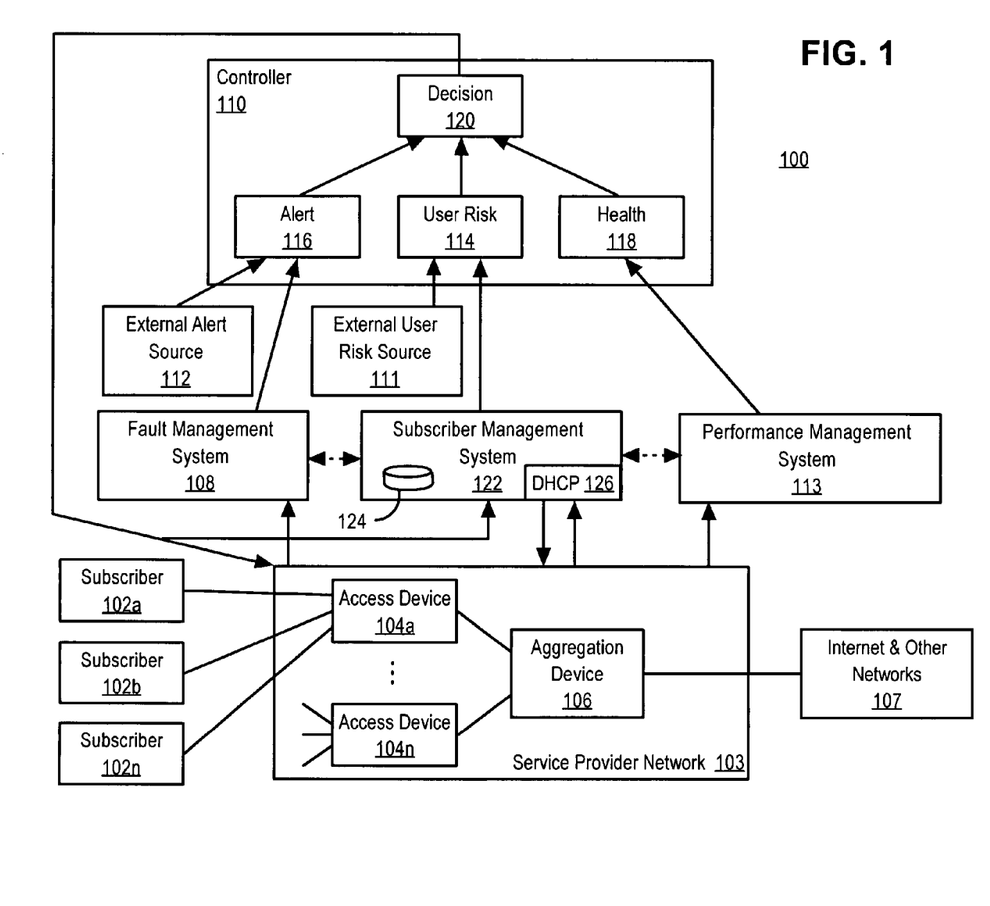
FIG. 1 is block diagram of a policy-based network security management system.

2.0 Structural and Functional Overview 2.1 Network Operations Center and its Network FIG. 1 is block diagram of a system including a policy-based network security management system. In the following description of FIG. 1, first each element is listed or briefly described by a descriptive title. Afterwards, FIG. 1 and its elements are described in more detail.

System 100 represents an example system that implements an administrative security decision-making process that may be state dependent. FIG. 1 includes users 102 *a–n*, a service provider network 103 having access devices 104 *a–n* and aggregation device 106. System 100 also includes fault management system 108, controller 110, optional external user risk source 111, external alert source 112, performance management system 113, and subscriber management system 122. Controller 110 includes user risk 114, alert 116, and/or health 118, and decision 120. Subscriber management system 122 may include repository 124, DHCP server 126, and/or other components. In alternative embodiments, system 100 may not have all of the features listed above or otherwise associated with FIG. 1, and/or may have other features in addition to or instead of the features listed above or otherwise associated with FIG. 1.

A user (or subscriber) refers to the device an individual is using to access the service provider network 103. Users can be personal computers connected directly to the access device 104a, or through some home access gateway (HAG). In the context of this application, the HAG plays no role and thus we consider the simple case where users 102a–n access a network (e.g., Internet and other networks 107) through access device 104a, which may be a router, switch, or other access device in the service provider network 103. The lines emanating from the left side of access devices 104b–n signify connections to other devices and/or users, which are not shown for clarity.

Service provider network 103 is a portion of the network that is controlled by a particular service provider. Subscribers 102a–n may be capable of accessing a network (e.g., Internet and other networks 107) via service provider network 103. Service provider 103 use controller 110 to provide security and the subscriber management services of subscriber management 122. Aggregation device 106 aggregates lower volume data pipelines to larger volume data pipelines. Since the different pipelines may not necessarily use the same protocol, aggregation device 106 may also translate the protocols from one pipeline to another.

Security events can be generated in any of a variety of different network elements, such as aggregation device 106, depending on the origin of the security degrading activities (malicious or innocent activities that threaten the security and/or health of network 103). In an embodiment, aggregation device 106 may include a point of presence. When the security events are determined to conform to a specified policy, then an alarm is sent. In one embodiment, alarms are sent to fault management system 108. A purpose of fault management system 108, which collects security events and other types of alarms, is to reduce the amount of events describing the same fault being sent off to external systems. Fault management system 108 sends only the security event data to alert 116 of controller 110. Fault management system 108 may also send the security event data to subscriber management system 122 to determine the subscribers who cause the security events. The subscriber management system 122 also keeps track of the high intensity actions that may cause a network entity to fail, resulting in a DoS attack.

Controller 110 also receives security data, via alert 116, from external alert source 112 and network health data, via health 118, from performance management system 113. The data from external alert source 112 may be information such as the likelihood of a terrorist attack, sabotage, act of war, criminal activity, other types of malicious acts, natural disasters, or other incidents that may affect network security. Performance management system 113 may be one or more devices or systems that monitor performance statistics of the network and/or of one or more network units to determine a network health. In general, the network health, wherever mentioned in this specification may be derived from performance statistics of the network and/or from performance statistics of network components or network units. The words components, modules, elements, and units may be substituted for one another through out this specification.

Optionally, controller 110 may receive, via user risk 114, external information regarding user risk from external sources such as external user risk source 111, which may be one or more law enforcement agencies, national security agencies, and/or other agencies linking a user to a terrorist organization or other terrorist activity, for example. Controller 110 uses user risk 114, alert 116, and/or health 118 to decide, via decision 120, on a course of action regarding a particular user. Since user risk level 114 takes into consideration user-specific measures, and since decision 120 takes into account user risk level 114, decision 120 is correlated to a user. The decision that is correlated to a user may be implemented via subscriber management system 122.

The decisions are made by controller 110 via decision 120 (with input from user risk level 114, alert 116, and/or health 118). The corresponding actions may be carried out by controller 110 sending the decision from decision 120 to subscriber management system 122. Subscriber management system 122 then communicates with the appropriate network elements of service provider network 103 to carry out the corrective action. Alternatively, controller 110 may communicate directly with the appropriate network device that will be used to carry out the corrective action. These two alternative embodiments are indicated by the two arrows one connecting decision 120 to subscriber management system 122, and the other connecting decision 120 to service provider 103.

User risk 114, alert 116, health 118, decision 120 may be separate software or hardware components and/or portions of components or may be mixed together in one software and/or hardware unit. Controller 110, user risk 114, alert 116, health 118 and control 120 are discussed further, below. Controller 110, fault management system 108, subscriber management system 122, performance management system 113, and aggregative device 106 may be included with in a Network Operations Center (NOC).

2.2 Controller

Controller 110 may be located either internally or externally with respect to subscriber management system 122. Controller 110 may be a policy-based security system, and may protect against network commands that may degrade the performance of the network. Generally, controller 110 assesses a state of the network, based on a combination of network and resource health, network alert level, and the user risk level. Controller 110 then decides on a course of action. Controller 110 is used to provide a mechanism to address security management and take administrative action against a security violation using, for example, a policy-based approach.

For example, controller 110 may be used to prevent users from contaminating network information (such as IP addresses spoofing and MAC addresses spoofing) or Denial-of-Service attacks (such as DHCP flooding and ARP table flooding). Further, controller 110 provides a network administrator and/or a service provider with the flexibility in making a decision to terminate a user's service, and thereby adjust the conditions of the network in a manner that reduces the likelihood of illegal flooding of the network. Controller 110 and may be run by an administrative system, such as a NOC, for making decisions regarding security issues. Controller 110 may be adaptive and programmable.

Controller 110 may utilize one or more of the user risk level, the network alert state, and the network and resource health states obtained via user risk 114, alert 116 and health 118, respectively, to decide via decision 120 on a course of action to protect against acts that may be detrimental to the network and/or to decide as to the likelihood that the acts were malicious in nature. In other words, the decision made by controller 110 may be a function of one or more of the alert state, the user risk state, and the network and resource health state. For example, in one embodiment the decision is a function of all three of the network alert state, the user risk level, and the network and resource health states, and may be stated mathematically as $$\text{Decision}(t, T_1, T_2, T_3) = f(\text{Alert\_State}(t,T_1), \text{User\_Risk\_State}(t,T_2), \text{Health\_State}(t,T_3)),$$

where t is the time at which decision is being made, $T_1$, $T_2$, and $T_3$ are the time windows for determining the alert state, user risk state, and health state, respectively. $T_1$, $T_2$, and $T_3$ may have different values from one another or two of or all three may have the same value. For example, in an embodiment, $T_2$ can be considerably longer than $T_1$, and $T_3$. $T_1$, $T_2$, and $T_3$ are user defined inputs. Another way of stating the above equation is that the decision is dependent on the user risk level, alert level, and health state conditions between times $t-T_1$, $t-T_2$, and $t-T_3$, respectively, and time t.

Briefly, during poor network performance and in the event of the detection of security events originating from one of users 102a–n who has a high risk level, the controller 110 may, for example, shut down the user's network access (terminate the connection between 104 and 102) to prevent the user from inflicting further damage before the network performance degrades even further. Thereby, controller 110 preserves network integrity and stability.

2.3 Alert

Alert 116 represents information that combines alert data from external alert source 112 and the present alarm data from fault management system 108 to derive an alert state. The network alert state specified or determined by alert 116 may be a function of the number of security events captured over the last $T_1$ units of time. The security events are the set of events that have implications to network security. Examples of security events include DHCP flooding, invalid unsolicited ARP (Address Resolution Protocol) packets, port ACL (Access Control List) violation, etc.

The network alert state, $\text{Alert\_State}(t, T_1)$, may be associated with alert 116, and may be a function of the number illegal ARP request (captured by an ARP inspection feature of aggregation device 106), for example, which may be a rule based function. An example of $\text{Alert\_State}(t, T_1)$ may be given by Table 1.

TABLE 1

$\text{Alert\_State}(t, T_1)$.

| Number of illegal ARP requests over $T_1$ | Alert State |
|---|---|
| >100 | Critical |
| Between 50 and 100 | High |
| Between 10 and 50 | Medium |
| Below 10 | Low |

The alert state may also be a function of external input from external alert source 112, such as a government warning that the risk of terrorist attacks are high. Similarly, the alert state may have a historical component and/or a global component (that is measured based on the entire network) that is a function of times t and $T_2$ or a time window of some other length, instead of or as a supplement to external inputs. The criticality of a particular alert state (whether it is labeled low medium, high or critical, for example) may depend on the size of the network and the type of services provided (e.g., business critical applications vs. flat rate standard residential Internet access). In an embodiment, service providers may set the alert level (e.g., critical, high, medium, or low) of alert 116 accordingly.

2.4 User Risk

User risk 114 collects and stores a history of the security event data. User risk 114 also uses the historical security event data to compute a risk state for individual users. In an embodiment, the output of user risk 114 describes the risk level (e.g., low, medium, high, or critical) associated with a user by keeping historical track of the user's alerts generated over time.

In different embodiments users with no prior network usage history may be treated differently. In an embodiment, the lowest risk level may be assigned to users with no history of committing acts that may potentially be malicious.

Table 2 gives an example of a user risk level function or user risk 114, $\text{User\_Risk\_State}(t, T_2)$

TABLE 2

$\text{User\_Risk\_State}(t, T_2)$

| Number of alerts in the time window of time $T_2$ (e.g., $T_2$ = 6 months) | User Risk State |
|---|---|
| >100 | Critical |
| Between 50 and 100 | High |
| Between 10 and 50 | Medium |
| <10 | Low |

The criticality of a particular user risk state (whether it is labeled low, medium, high, or critical, for example) may depend on the size of the network and the type of services provided (e.g., business critical applications vs. flat rate standard residential Internet access). In an embodiment, service providers may set the user risk level (e.g., critical, high, medium, or low) of user risk 114 accordingly.

2.5 Health

Health 118 takes network health data from performance management system 113 and derives a health state for the network. Health 113 may be one or more devices or systems that monitor network health. Although health 118 and performance management system 113 are depicted in FIG. 1 as different units, in alternative embodiments they may be the same unit, which may be internal or external to controller 110.

As indicated the above equation for $\text{Decision}(t, T_1, T_2, T_3)$, the health state generated by health 118 may be a function of time window $T_3$ and starting time t, and may therefore be written as $\text{Health\_State}(t, T_3)$. Some examples of factors that affect the health of a network are the resource utilization, latency, service availability, network latency jitter, average response time, packet loss probability (PLP), mean time to repair, mean time between failure, network throughput, and average network downtime.

The health state may be a prior art network state (which does not include the health of other resources) or, alternatively, may additionally include the state of a resource, such as the utilization of a DHCP sever (e.g., DHCP server 126). In other words, the health state may be the resource and network health state is a function of the parameters that describes the health of the resources as well as network.

Determining a network state may include determining a network Packet Loss Probability (PLP), which may also be a function of an ending time t and window of time $T_3$ over which PLP is measured. For example, PLP may be calculated using the formula $$PLP(t, T_3) = \left( \sum_i y_i \cdot \text{PLP\_Network\_Element\_i} \right),$$

where $y_i$ is a weighting factor for network element i, in which $$\sum_i y_i = 1.$$

The weighting factors $y_i$ may be determined according to how important the element is to the overall functioning of the network and/or to the economic health of the service provider. Using PLP as the health parameter, the values of Health_parameters(t, $T_3$) thresholds may be established as rules for determining Health_State (t, $T_3$) according to Table 3, below.

TABLE 3

Health_State (t, $T_3$)

| Network and Resource of the network in terms of PLP | Health State |
|---|---|
| >.01 | Critical |
| Between .01 and .001 | Poor |
| Between .001 and .0001 | Medium |
| Below 0.0001 | Good |

Examples of resource states used for determining the health associated with a resource include DHCP server utilization, which may also be a function of an ending time t and window of time $T_3$ over which DHCP is measured. For example DHCP may be calculated using the mathematical formula, $$DHCP\_Util(t, T_3) = \left( \sum_i w_i \cdot DHCP\_Util\_Network\_Element\_i \right),$$

where $w_i$ is the user-defined weighting factor for the network element number i, where $$\sum_i w_i = 1.$$

Similar to weighting factors $y_i$, the weighting factors $w_i$ may be determined according to how important the element is to the overall functioning of the network and/or to the economic health of the service provider.

Using DHCP utilization as the health parameter, the values of Health_Parameters(t, $T_3$) thresholds may be established as rules for determining Health_State (t, $T_3$) according to Table 4, below.

TABLE 4

Health_State (t, $T_3$)

| Network and Resource of the network in terms of DHCP utilization | Health State |
|---|---|
| >90% | Critical |
| Between 60% and 90% | Poor |
| Between 30% and 60% | Medium |
| Below 30% | Good |

If the health is described by more than one parameter, health 118 will provide a flexible mechanism for service provider to determine the health of the overall network using one or more of the health parameters. Other health parameters may be used that include network latency, utilization, and other Service Level Agreement (SLA) parameters. In general, there can be many health states.

2.6 Decision

Decision 120 may combine one or more of the user risk state from user risk 114, the alarm state from alert 116, and the health state from health state 118 according to the equation for Decision(t, $T_1$, $T_2$, $T_3$) and may make a decision about what action to take with regard to individual users, such as whether to do nothing, issue a warning, or whether to temporarily or permanently restrict service or deny service with or without a warning.

The controller 110, via decision 120, may use of the alert state, user-risk level, and the network and resource health state to make a decision when a security event occurs. The decision may be based on a set of programmable rules that maps all combinations of alert state, user-risk level, and network and resource health state into a set of pre-defined actions.

Although security events may be due to users with malicious intent, security events may also be caused by primitive subscribers' mistakes. For example, a user may accidentally configure his or her computer with the wrong IP address causing the computer to generate an ARP packet claiming an illegal MAC-IP association. More importantly, other types of requests (e.g., DHCP discovery) are legal and legitimate but the intention of the subscriber is typically difficult to interpret from early requests. Service providers need to take the time to analyze early requests and possibly wait for more additional requests before an action can be taken.

For example, DHCP discovery is legal. However, a DHCP flood attack may be preformed by issuing a large number of legal DHCP discovery messages continuously over a short period of time. Analyzing the DHCP discovery messages to determine if they will degrade the performance of the system may take enough time that the network may crash before the analysis is completed and the results are understood. Thus, it is desirable to use controller 110 in place to prevent such catastrophic events.

Certain networks may have a large number of users who are uninformed and who innocently perform legal operations that negatively affect network health and security. Such networks are said to have a primitive cultural environment. If the cultural environment of a particular network is primitive, users are more likely to make mistakes and therefore more likely to contribute to a degradation of the health of the network even if their intentions are innocent. Similarly, primitive users may be more likely to be low revenue users, and low revenue users may be more likely to be primitive users. Therefore, depending on the cultural environment, to minimize the potential damage caused by denying access to an innocent user, the controller 110 may be programmed to shutdown primitive and/or low revenue subscribers before shutting down high revenue subscribers and/or subscribers at a lower risk level, for example.

Additionally, to minimize the potential economic damage caused by denying access to an innocent user, controller 110 may be programmed to terminate access to low revenue subscribers before shutting down high revenue subscribers or at a lower risk level. During periods in which the network or its resources are in poor health, the controller may issue an instant message to a user that the controller would not otherwise shut down. The instant message may inform the user that the controller is shutting down the access port temporarily, but that service can be resumed once network performance improves.

The decision may be based on how much revenue the subscriber brings to the service provider that owns the relevant portion of the network. For example, a particular policy of controller 110 may provide that high-revenue business subscribers who typically contribute to more than 80% of the revenue of the service provider, may only be warned regarding the type of alarm that are collected, while an individual user may be shut down temporarily from the same activity.

The alert, health, and user risk rules may be used to determine, decision rules, which may be the output of decision 120 in the form of Decision(t, $T_1, T_2, T_3$) An example of decision rules used to determine Decision(t, $T_1$, $T_2$, $T_3$) is given in Table 5, below.

TABLE 5

Decision(t, $T_1$, $T_2$, $T_3$)

| Alert State | Health State | User Risk State | Decision |
|---|---|---|---|
| Critical | Critical | Critical | Shutdown the malicious user access (e.g., the user's port) immediately after the very first attack (alarm) to prevent the network from possible crashing |
| High | Low | Critical | Send a warning message after the first alarm (e.g., "You have attempted to send an illegal DHCP request to modify your IP/MAC address. Your access will be terminated if attempt again. Please call your network administrator if you have any questions"). If another illegal request is attempted from the same port within T, the port will be terminated. |
| Medium | Good | Low | Investigate all alarms in details before an action is taken |

The user access point may be identified from the system log message issued by a switch and a Network Management System (NMS) system, which may correlate the access point ID to the end user. For example, a port in an Ethernet-to-the-x (ETTx) network, or a MAC address in a wireless network, may be identified from the syslog message issued by router 104a and subscriber management system 122 may correlate the access point ID to the end user.

2.7 Subscriber Management System

Subscriber management system 122 may be a Network Management System or Operation Support System (NMS/OSS). The NMS or OSS may perform fault management and performance management. The NMS or OSS may be a system that has a global view of the entire network. The global view may be useful in preventing or reducing the likelihood of a user moving from one part of the network in response to an action that is taken against the user.

As an example, subscriber management system 122 can form a part of the Cisco Broadband Access Center for ETTx (BAC-ETTx), from Cisco Systems, Inc. Subscriber management system 122 may be used in wireless systems such as Cisco Mobile Wireless Center (MWC). Subscriber management system 122 may have other security features in addition to those described herein or provided via controller 110.

DHCP server 126 may be used for changing IP addresses or other information associated with the IP address, for example. Subscriber management system 122 correlates the security event data with individual users, such as users 102a–n, to apply a decision of decision 120 to an appropriate one of users 102a–n. After correlating the alarm with a user, subscriber management system 122 may send the correlation data to controller 110 so that the decision may be correlated with a user. Alternatively, subscriber management system 122 may receive the decision from controller 110. The subscriber management system then sends the correlated decision of decision 120 to be applied to the service provider network 103.

3.0 Operational Examples 3.1 Method of Policy-Based Network Security Management

Figure 2:
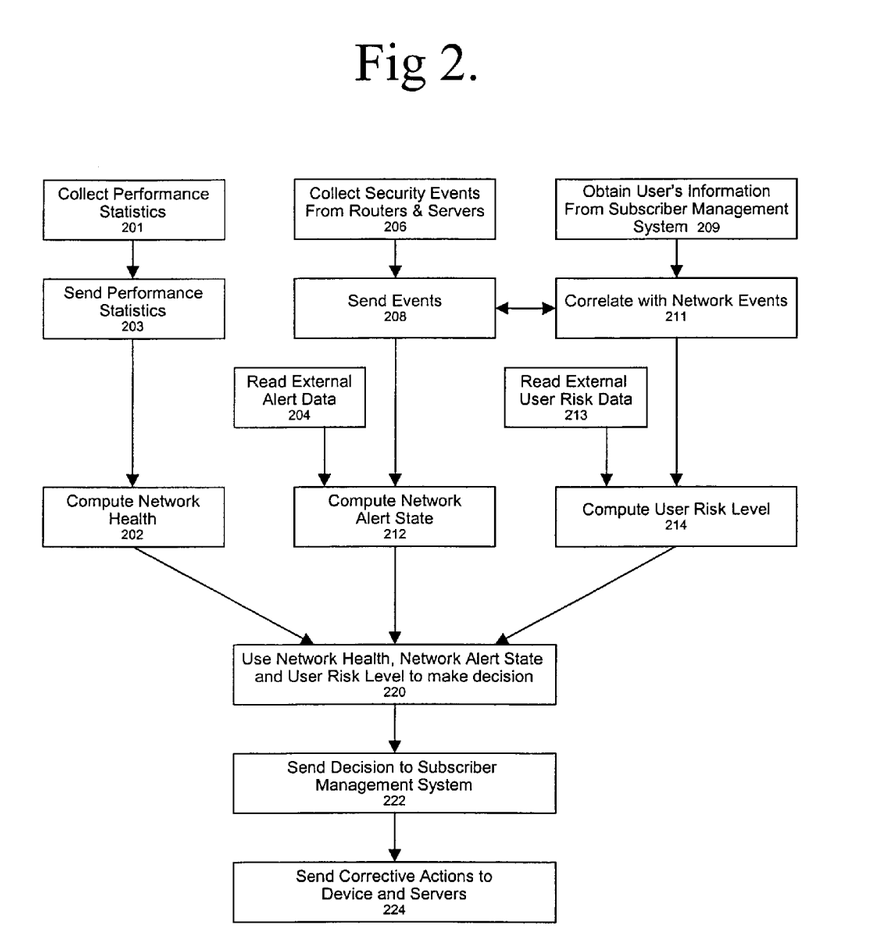
FIG. 2 is a flow diagram of an example method for providing policy-based network security management.

FIG. 2 is a flow diagram of an example method for providing policy-based network security management. For the purpose of illustrating a clear example, FIG. 2 is described herein with respect to the context of FIG. 1. Thus, FIG. 2 shows a method for implementing the operations associated system 100, which may be associated with a NOC. However, FIG. 2 may be applied in many other contexts, and is not limited to the environment of FIG. 1. Further, in FIG. 2, a step on a path in the flow chart that is parallel to the path of other steps may be performed in any order with respect to other steps. For example, step 204 may be preformed in any order (e.g., before, after, or during) with respect to the sequence of steps 206 and 208, located on a parallel path of the flow chart.

In step 201, performance management system 113 collects performance statistics related to service provider network 103. Statistics may also be collected regarding the health and performance of individual units, such as those that are critical to or that are likely to have at least some impact on the overall network health. In step 202, the performance statistics collected in step 201 is sent to controller 110 for analysis by health 118. In step 203, the performance statistics are used to compute the overall health of service provider network 103.

During step 204 external alert data from external alert source 112 is read by alert 116. During step 206, security events are collected from service provider network 103. During step 208, service provider network 103 sends one or more alarms to fault management system 108, which checks for duplications or in the alarm data and removes and deduplicates the duplicate alarm data. In an embodiment, fault management system 108 may also perform other analysis of the alarm data to correct faults and/or to remove other false indicators of alarms. During step 212 the alert data from step 204 and the alarm data from step 208 are used to calculate an alarm state or level.

During step 209, user information is obtained from subscriber management system 122. During step 211 security events that were gathered in step 208 by fault management system 108 are correlated with subscriber information from subscriber management system 122. During step 213 external user risk data from external user risk source 211 is read by user risk 114. During step 214, the correlated security event data from step 211 and the external user risk data from step 213 are used to calculate user risk level.

During step 220, the health state 118 computed in step 203, the alert level from alert 116 computed during step 212, the user risk level computed by user risk 114 during step 214 are used by decision 120 to decide whether any corrective action needs to be taken, and if corrective action should be taken what corrective action to take.

In step 222, the decision is sent to the subscriber management system 122. In step 224, directives related to the correction action to take are sent from subscriber management system 122 to the service provider network 103. In an alternative embodiment controller 110 sends the decision from decision 120 to service provider network 103.

The general principles of policy-based network security management described above for FIG. 2 may be applied to many contexts and used to address many prospective problems and attacks. Examples of specific applications are now provided.

3.2 DHCP Flood Prevention

In certain environments, a network service provider dynamically assigns network addresses to a plurality of independent ISPs. For example, to support Equal Access Network (EAN) requirements in Europe, Middle East, and Africa (EMEA), a DHCP server may assign blocks of IP address for different ISP providers. Thus, the number of IP addresses for each ISP (e.g., ISP1) is limited and depends on the ISP size and the number of services the ISP offers. A DHCP server of this type is provided as part of the Cisco Network Registrar (CNR) module of BAC-ETTx, from Cisco Systems, Inc.

Assume that a hypothetical network user, "John," is a legitimate subscriber to a first ISP, ISP1, which may be managed at a NOC using controller 110. Assume further that John intends to flood the network by running a program that issues a message that changes the MAC address of the Network Interface Card (NIC) of the PC, followed by a DHCP discovery message, and repeats this message sequence a large number of times. ISP1 is particularly vulnerable to such an attack, because ISP1 has a limited pool of IP addresses. Eventually, John will cause ISP1 to consume its entire IP address space, until all unused IP addresses are timed out and become available for lease again. This will result in a denial of network service to legitimate users who need dynamically assigned addresses. Thus, it is critical for the service providers to take action before the service is affected.

To prevent this potential disruption of service, ISP1 can implement a lookup table that assigns an alert level (e.g., critical, high, medium, and low) based on the number of DHCP discovery packets that are received within a time interval $T_1$ from any particular port. ISP1 may determine the alert level, the user risk state, and the resource network health state according to the tables below. The utilization of the DHCP server for ISP1 pools of IP addresses is an example of resource network health state for this scenario.

Specifically, ISP1, via alert 116, may decide to calculate the alert state Alter_State(t, $T_1$) based on the rules of Table 6.

TABLE 6

| Alert_State(t, $T_1$) | |
| --- | --- |
| DHCP discovery from same port over $T_1$ | Alert State |
| >50 | Critical |
| Between 25 and 50 | High |

ISP1, via health 118, may decide to calculate the health state, Health_State(t, $T_3$), according to Table 7.

TABLE 7

| Health_State(t, $T_3$) | |
| --- | --- |
| DHCP Util for ISP1 of the network | Health State |
| >.9 (over 90% of IP addresses have been used) | Critical |

TABLE 7-continued

| Health_State(t, $T_3$) | |
| --- | --- |
| DHCP Util for ISP1 of the network | Health State |
| Between .8 and .9 | Low |
| Between .5 and .8 | Medium |
| Below 0.5 | Good |

ISP1, via user risk 116, may decide to calculate the user risk state, User_Risk_State(t, $T_2$), according to Table 8.

TABLE 8

| User_Risk_State(t, $T_2$) | |
| --- | --- |
| No of alerts in the past 6 months | User Risk State |
| >100 | Critical |
| Between 50 and 100 | High |
| Between 10 and 50 | Medium |
| <10 | Low |

User_Risk_State(t, $T_2$) from user risk 114, Alert_state(t, $T_1$) from alert 116 and Health_State(t, $T_3$) from health 118, ISP1, via decision 120, may decide to calculate the decision, Decision(t, $T_1$, $T_2$, $T_3$), according to Table 9.

TABLE 9

| Decision(t, $T_1$, $T_2$, $T_3$) | | | |
| --- | --- | --- | --- |
| Alert State | Health State | User Risk State | Decision |
| Critical | Critical | Critical | Shutdown the malicious user's access immediately |
| High | Low | High | Send a warning message after the first alarm (e.g., "You have made too many DHCP requests. Your access will be terminated if you attempt again. Please call your network administrator if you have any questions"). If another DHCP discovery is attempted from the same port within T, the port will be shut down. |

ISP1 may change how Health_State(t, $T_3$), User_Risk_State(t, $T_2$), Alert_state(t, $T_1$), and/or Decision(t, $T_1$, $T_2$, $T_3$) by programming and/or setting parameters of an existing program or hardware unit of controller 110.

3.3 ARP Flooding Prevention

ARP table flooding, another type of DoS attack, can be prevented in a very similar fashion as in the DHCP flooding. Each network element has an ARP table to hold the MAC address and IP address associations, and it is of finite size. "John" can flood the ARP table of a network element by a small program to send an ARP response with bogus MAC and IP address associations to the target network element repeatedly. The network element under attack thinks there are new devices joining the network every time it sees a new MAC and IP association. Eventually, the ARP table will be filled up. Then the network element will act as a simple bridge and begin broadcasting all the received packets. Performance is significantly reduced.

Rules similar to DHCP flooding prevention can be used. For example, the number of ARP responses from the same port over the past $T_1$, time can be used to determine the alert state, and the ARP table utilization can be used to determine the health state. Decision rule similar to Table 9 can be used.

3.4 IP Address Spoofing Prevention

Consider two users 102a ("Bob") and 102b ("Alice") that are ETTx (Ethernet-to-the-Home/Business) subscribers and who access the network 103 with PC. Assume that user 102a ("Bob") wants to intercept and inspect (or "sniff") traffic originating from or directed to user 102b ("Alice"). Bob sends a bogus ARP packet to Alice claiming he is Alice's default gateway. Bob then turns on IP forwarding, and as a result Alice's traffic is sent to Bob. Bob then forwards the traffic to the actual default gateway. Bob now successfully sniffs all packets originating from Alice.

When IP spoofing is detected in router 104a via subscriber management system 122, for example, fault management system 108 may be notified through syslog messages from the network 103. Subscriber management system 122 then correlates the syslog message to its subscriber records to identify the attacker. The operator is then notified and appropriate action can be taken based on controller 110. Controller 110 generates a decision based on user risk level, network health state, and network alert state, through a table similar to Table 9.

3.5 MAC Address Spoofing Prevention

MAC address spoofing prevention can be achieved in a similar fashion as IP address spoofing prevention. Assume again Bob wants to sniff Alice's traffic. In the case of MAC address spoofing, Bob will sends a bogus ARP packet to the default gateway claiming himself as Alice. The default gateway will then sends Alice's traffic to Bob. Bob turns on IP forwarding, and as a result all Alice's incoming traffic is going through Bob.

When MAC spoofing is detected in router 104a via subscriber management system 122, for example, fault management system 108 may be notified through syslog messages from the network 103. Subscriber management system 122 then correlates the syslog message to its subscriber records to identify the attacker. The operator is then notified and appropriate action can be taken based on controller 110.

4.0 Implementation Mechanisms—Hardware Associated with System

Figure 3:
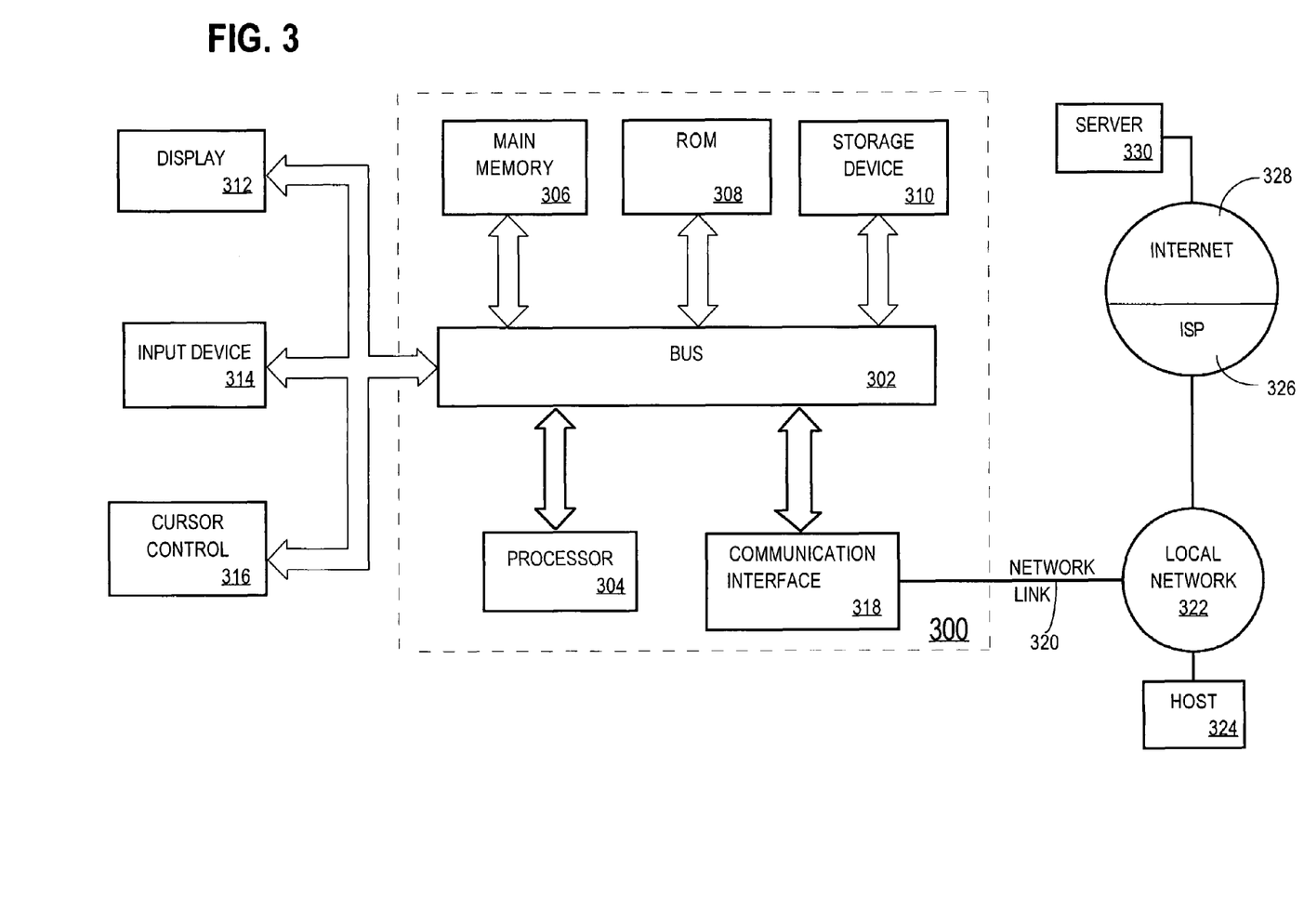
FIG. 3 is a block diagram that illustrates a computer system upon which an embodiment may be implemented.

FIG. 3 is a block diagram that illustrates a computer system 300 upon which an embodiment may be implemented. In an embodiment, computer system 300 may be used for any of or any combination of users 102a–n, aggregation device 106, fault management system 108, controller 110, and/or subscriber management system 122. Also, computer 300 may be or may form a part of fault management system 108, controller 110, and/or subscriber management system 122. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In an embodiment, the invention is related to policy-based network security management. According to one embodiment of the invention, policy-based network security management are provided by one or more systems such as computer system 300 via processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for policy-based network security management as described herein.

The received code may be executed by processor 304 as it is received, and/or stored in storage device 310, or other non-volatile storage for later execution. In this manner, computer system 300 may obtain application code in the form of a carrier wave.

5.0 Extensions and Alternatives

Although the above disclosure refers to "alarms" in many places, it will be understood that any other alert or security events may also be used instead.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A policy-based network security management system, the system comprising:
   a security management controller comprising one or more processors;
   a computer-readable medium carrying one or more sequences of instructions for policy-based network security management, wherein execution of the one or more sequences of instructions by the one or more processors causes the one or more processors to perform the steps of:
      receiving a set of data regarding a user of a network, wherein the set of data is a first set of data that is collected over a first duration of time;
      receiving a second set of data that is collected over a second duration of time, wherein the first duration of time is shorter than the second duration of time;
      creating and storing a risk level of the user based on the second set of data, wherein the second duration of time is sufficient to collect historical data regarding past malicious activities of the user, and wherein the risk level is a discrete value representing a long-term measurement of the likelihood of the user harming the network;
      creating and storing a current alert level based on the first set of data, wherein the first duration of time is of a length appropriate for assessing current activities of the user, and wherein the current alert level is a discrete value representing a current measurement of the likelihood of the user negatively affecting the network;
      automatically deciding on a course of action based on the risk level and the current alert level, wherein the course of action may be adverse to the user although the current alert level is insufficient to establish whether the user is performing a malicious action; and
      sending signals to one or more network elements in the network to implement the course of action.

2. The system of claim 1, wherein the set of data includes at least one or more alerts related to the user.

3. The system of claim 1, wherein the signals include multiple alerts generated by multiple users; and the system further comprising sequences of instructions for correlating the multiple alerts to the multiple users.

4. The system of claim 1, further comprising sequences of instructions for performing the steps of:
   receiving signals related to an external source including at least an alert assessment relevant to the network as a whole; and
   creating and storing a current alert level value based on the alert assessment.

5. The system of claim 1, further comprising sequences of instructions for performing the steps of:
   receiving signals carrying performance information related to a health level of the network; and
   determining the course of action based at least in part on the set of data and the performance information.

6. The system of claim 1 further comprising:
   a plurality of routers for routing information sent by users and servers to a variety of destinations;
   a subscriber management system for managing a network;
   a controller for executing the sequences of instructions;
   a network element for generating input for the set of data; and
   sequences of instructions for sending signals to the network elements.

7. A method of providing policy-based network security management, comprising the steps of:
   receiving a set of data regarding a user of a network, wherein the set of data is a first set of data that is collected over a first duration of time;
   receiving a second set of data that is collected over a second duration of time, wherein the first duration of time is shorter than the second duration of time;
   creating and storing a risk level of the user based on the second set of data, wherein the second duration of time is sufficient to collect historical data regarding past malicious activities of the user, and wherein the risk level is a discrete value representing a long-term measurement of the likelihood of the user harming the network;

creating and storing a current alert level based on the first set of data, wherein the first duration of time is of a length appropriate for assessing current activities of the user, and wherein the current alert level is a discrete value representing a current measurement of the likelihood of the user negatively affecting the network;

automatically deciding on a course of action based on the risk level and the current alert level, wherein the course of action may be adverse to the user although the current alert level is insufficient to establish whether the user is performing a malicious action; and sending signals to one or more network elements in the network to implement the course of action.

8. The method of claim 7 wherein the set of data includes at least one or more alerts related to the user.

9. The method of claim 7, wherein the signals include multiple alerts generated by multiple users, and the method further comprises correlating the multiple alerts to the multiple users.

10. The method of claim 7 further comprising receiving signals related to an externalsource including an alert assessment relevant to the network as a whole, wherein the current alert level is also based on the alert assessment.

11. The method of claim 7 further comprising receiving signals carrying performance information related to a health level of the network, wherein the course of action is based on the set of data and the performance information.

12. A method of policy-based network security management, comprising the computer-implemented steps of:

collecting network performance statistics related to an overall health of a network and individual performance statistics of one or more individual units of the network, the collecting being performed by a performance management system;

sending the network performance statistics to a controller for analysis;

computing an overall health state based on the network performance statistics and the individual performance statistics, using the controller;

reading external alert data from an external alert source, using the controller;

collecting security event data from the network;

sending the security event data to a fault management system;

using the fault management system for checking for duplications in the security event data, and deduplicating duplicate security events in the security event data;

calculating an alert state based on the security event data from the fault management system and the external alert data, wherein the alert state is a discrete value representing a current measurement of the likelihood of the network being negatively affected;

obtaining user information from a subscriber management system;

correlating the security event data from the fault management system with the user information to form correlated security event data;

reading external user risk data from an external user risk source into the controller;

calculating a user risk state based on the correlated security event data and the external user risk data, using the controller, wherein the user risk state is a discrete value representing a long-term measurement of the likelihood of the network being harmed;

calculating a decision regarding whether to take corrective action based on the overall health state, the alert state, and the user risk state, using the controller;

sending the decision from the controller to the subscriber management system; and sending directives, related to the decision, from the subscriber management system to the network.

13. A system comprising:

a fault management system that receives network security data and deduplicates duplicate indications of security events in the network security data to form deduplicated security event data;

a subscriber management system that manages subscribers using a network, wherein the subscriber management system stores subscriber information about individual users and is capable of sending directives to the individual users based on a decision to take corrective action toward the individual users;

wherein the deduplicated security event data from the fault management system is correlated to the subscriber information to form correlated network security data;

a performance management system that receives overall performance data related to an overall health of the network and individual performance data related to a health of one or more individual units of the network; and a controller that:
receives external alert data from an external alert source, external user risk data from an external user risk source, the deduplicated security event data, the correlated network security data, the overall performance data, and the individual performance data;

computes an alert state based on at least the external alert data and the deduplicated security event data, wherein the alert state is a discrete value representing a current measurement of the likelihood of the network being negatively affected;

computes a user risk state based on at least the external user risk data and the correlated network security data, wherein the user risk state is a discrete value representing a long-term measurement of the likelihood of the network being harmed;

computes a health state based on at least the overall performance data and the individual performance data;

makes the decision whether to take corrective action based on at least the alert state, the user risk state, and the health state; and causes directives that implement the decision to be sent to the network.

14. An apparatus for providing policy-based network security management, comprising:

means for receiving a set of data regarding a user of a network, wherein the set of data is a first set of data that is collected over a first duration of time;

means for receiving a second set of data that is collected over a second duration of time, wherein the first duration of time is shorter than the second duration of time;

means for creating and storing a risk level of the user based on the second set of data, wherein the second duration of time is sufficient to collect historical data regarding past malicious activities of the user, and wherein the risk level is a discrete value representing a long-term measurement of the likelihood of the user harming the network;

means for creating and storing a current alert level based on the first set of data, wherein the first duration of time is of a length appropriate for assessing current activities of the user, and wherein the current alert level is a discrete value representing a current measurement of the likelihood of the user negatively affecting the network;

means for automatically deciding on a course of action based on the risk level and the current alert level, wherein the course of action may be adverse to the user although the current alert level is insufficient to establish whether the user is performing a malicious action; and means for sending signals to one or more network elements in the network to implement the course of action.

15. The apparatus of claim 14, wherein the first set of data includes at least one or more alerts related to the user.

16. The apparatus of claim 14, wherein the signals include multiple alerts generated by multiple users; and the apparatus further comprises means for correlating the multiple alerts to the multiple users.

17. The apparatus of claim 14, further comprising:

means for receiving signals related to an external source including at least an alert assessment relevant to the network as a whole; and means for creating and storing a current alert level value based on the alert assessment.

18. The apparatus of claim 14, further comprising:

means for receiving signals carrying performance information related to a health level of the network; and means for determining the course of action based at least in part on the set of data and the performance information.

19. The apparatus of claim 14, further comprising:

means for communicatively connecting to a plurality of routers that route information sent by users and servers to a variety of destinations;

means for communicatively connecting to a subscriber management system for managing a network;

means for communicatively connecting to a network element for generating input for the first set of data; and means for sending signals to the network element.

* * * * *